United States Patent [19]

Kako et al.

[11] 4,299,140
[45] Nov. 10, 1981

[54] TRANSFER DEVICE FOR FOUR WHEEL DRIVE

[75] Inventors: Hiroyoshi Kako; Hajime Arai, both of Aichi, Japan

[73] Assignee: Toyota Jidosha Kogyo Kabushiki Kaisha, Toyota, Japan

[21] Appl. No.: 971,567

[22] Filed: Dec. 20, 1978

[30] Foreign Application Priority Data

Jul. 12, 1978 [JP] Japan .................... 53/854467

[51] Int. Cl.³ .............. F16H 37/06; F16H 37/08; F16H 3/38
[52] U.S. Cl. ..................... 74/665 G; 74/665 GC; 74/700; 74/701; 74/339
[58] Field of Search ............ 74/695, 700, 701, 705, 74/745, 665 F, 665 G, 665 GA, 665 R, 339, 665 GC

[56] References Cited

U.S. PATENT DOCUMENTS

| | | | |
|---|---|---|---|
| 2,962,916 | 12/1960 | Koelsch | 74/710.5 |
| 3,470,766 | 10/1969 | Magg et al. | 74/701 X |
| 3,505,904 | 4/1970 | Williams, Jr. | 74/665 R |
| 3,859,870 | 1/1975 | Whateley | 74/745 |
| 4,138,906 | 2/1979 | Nakao et al. | 74/665 R X |

Primary Examiner—C. J. Husar
Assistant Examiner—Frank McKenzie
Attorney, Agent, or Firm—Oblon, Fisher, Spivak, McClelland & Maier

[57] ABSTRACT

A transfer device associated with a power transmission unit includes an input shaft for connection to an output shaft of the transmission unit, a first output shaft axially aligned with the input shaft through an intermediate shaft, a second output shaft located parallelly apart from the input and intermediate shafts, a selector gear unit associated with a change-speed gearing for selectively completing low and high speed gear trains, and a differential gear unit mounted on the intermediate shaft for distributing drive power to the first and second output shafts. In the change-speed gearing, a high speed drive gear is connected with an output member of the differential gear unit and in mesh with a high speed counter-gear to provide a power path between the differential gear unit and the second output shaft, and a second selector gear unit is assembled adjacent to the first-named selector gear unit on a common axis to control the operation of the differential gear unit.

4 Claims, 8 Drawing Figures

TRANSFER DEVICE FOR FOUR WHEEL DRIVE

BACKGROUND OF THE INVENTION

The present invention relates to a transfer device associated with a power transmission unit for an automotive vehicle of four wheel drive type, and more particularly to a tansfer device of the type which includes an input shaft for connection to an output shaft of the transmission unit, a first output shaft axially aligned with the input shaft through an intermediate shaft, a second output shaft located parallely apart from the input and intermediate shafts, a selector gear unit for selectively completing low and high speed gear trains among the input shaft and the first and second output shafts, and a differential gear unit mounted on the intermediate shaft to distribute drive power to the first and second output shafts at a predetermined gear ratio.

In a conventional transfer device of this kind, for example, as shown in FIG. 8, an input shaft 1 is axially aligned with a first output shaft 3a through an intermediate shaft 2, and a second output shaft 5 is located parallely apart from the input and intermediate shafts. In the transfer device, a first selector gear unit 6 is associated with a change-speed gearing 4 to selectively complete low and high speed gear trains, and a differential gear unit 3 includes an input member connected with the intermediate shaft 2 and a pair of output members in the form of side gears 3c, 3b. Power transmission from the side gear 3c to the second output shaft 5 is conducted by a chain drive mechanism 8 which is arranged between the change-speed gearing 4 and the differential gear unit 3. The chain drive mechanism 8 comprises a pair of sprockets 8a, 8b respectively connected with the side gear 3c and the second output shaft 5 and a drive chain 8c stretched over the sprockets 8a, 8b. The transfer device further includes a second selector gear unit 7 which is assembled between the chain drive mechanism 8 and the differential gear unit 3 to control the operation of differential gear unit 3.

In such a transfer device as described above, the chain drive mechanism 8 enlarges the size of the transfer device and increases the number of component parts of the transfer device. Additionally, the first and second selector gear units 6 and 7 are independently operated by separate shift mechanisms which are complicated in construction and occupy a large space within the transfer device.

SUMMARY OF THE INVENTION

It is, therefore, a primary object of the present invention to provide an improved transfer device wherein the above-noted chain drive mechanism is removed to reduce the number of component parts, and wherein a high speed drive gear is connected to an output member of the differential gear unit and in mesh with a high speed counter-gear to provide a power path between the differential gear unit and the second output shaft.

Another object of the present invention is to provide an improved transfer device in which the first selector gear unit is assembled adjacent to the second selector gear unit on a common axis to simplify the construction of the shifting mechanisms.

Still another object of the present invention is to provide an improved transfer device in which the first and second selector gear units are shifted by a single operator's lever to ensure smooth shifting manipulation.

A further object of the present invention is to provide an improved transfer device in which the differential gear unit may be removed when the transfer device is to be used for two or four wheel drive.

According to the present invention, there is provided a transfer device associated with a power transmission unit for an automotive vehicle, which transfer device comprises an input shaft for connection to an output shaft of the transmission unit, an intermediate shaft rotatably coupled at the inner end thereof with the input shaft, a first output shaft rotatably coupled at the inner end thereof with the outer end of the intermediate shaft, a countershaft arranged in parallel with the input and intermediate shafts and being integrally provided with low and high speed counter-gears, a second output shaft arranged in parallel with the countershaft and being integrally provided with an output gear meshing with the high speed counter-gear, a low speed drive gear rotatable on the input shaft and being in mesh with the low speed counter-gear, a high speed drive gear rotatable on the intermediate shaft and being in mesh with the high speed counter-gear, the high speed drive gear having the same number of teeth as those of the output gear, a differential gear unit mounted on the intermediate shaft and including an input member connected with the intermediate shaft, a first output member connected with the first output shaft, and a second output member connected with the high speed drive gear, a first selector gear unit mounted on the input shaft for selectively connecting the input shaft to the low speed drive gear and the intermediate shaft to complete low or high speed gear train, and a second selector gear unit mounted on the intermediate shaft for connecting the high speed drive gear to the intermediate shaft to make the differential gear unit inoperative and disconnecting the high speed drive gear from the intermediate shaft to make the differential gear unit operative.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
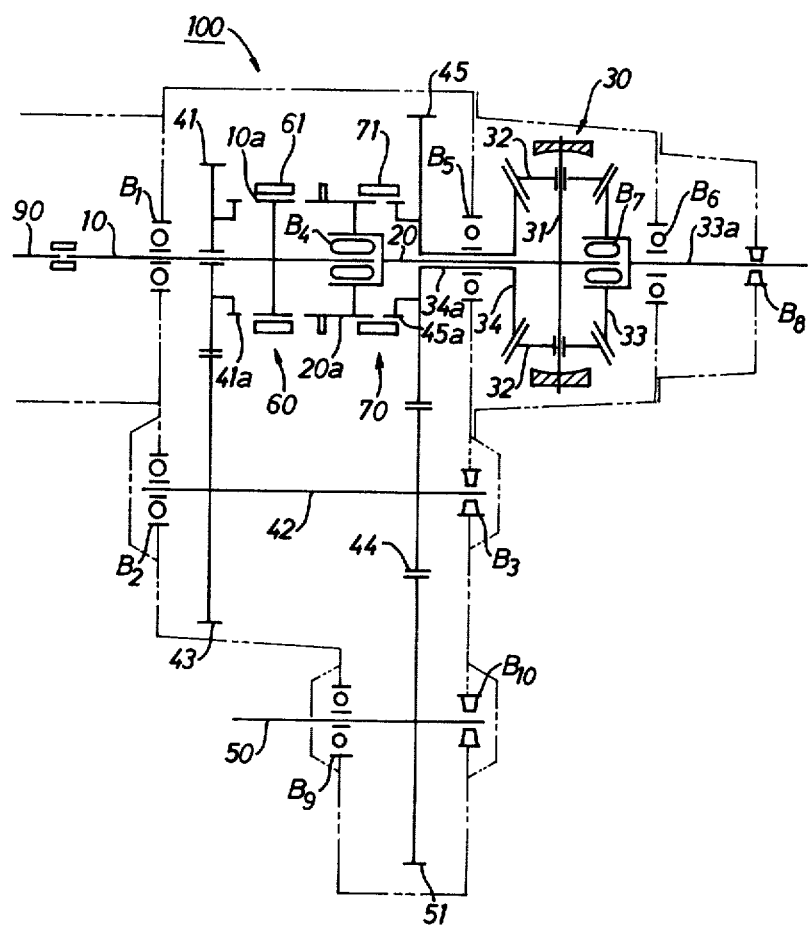
FIG. 1 is a schematic skeleton view of a transfer device in accordance with the present invention.
Figure 2:
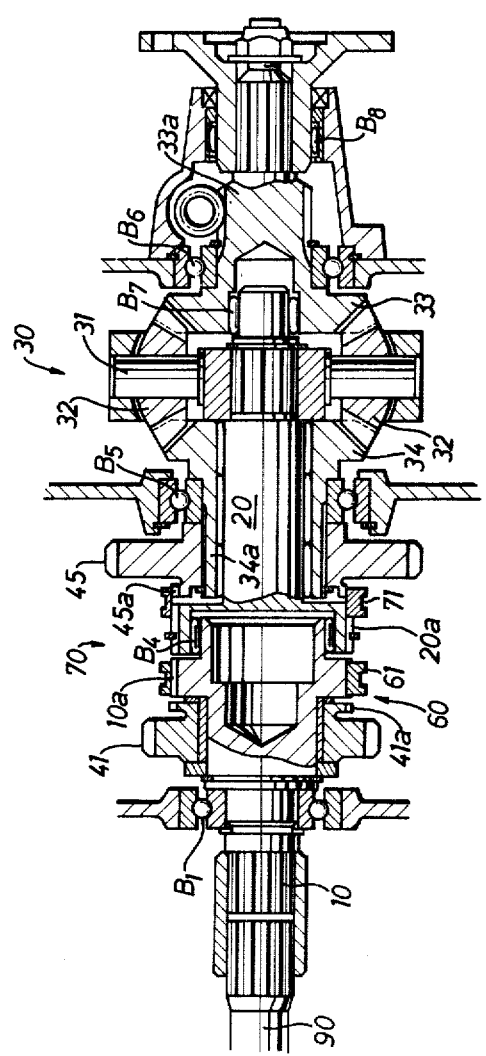
FIG. 2 is a sectional view of an embodiment of the first and second selector gear units shown in FIG. 1.

Referring now to FIGS. 1 and 2 of the drawings, a transfer device 100 of the present invention is conditioned in its neutral position which comprises an input shaft 10 connected to an output shaft 90 of a power transmission unit (not shown) by means of a spline coupling. The input shaft 10 is rotatably supported by a bearing $B_1$ on a transfer casing and integrally provided with a clutch hub 10a. A low speed drive gear 41 is freely rotatable on the input shaft 10 and carries a set of external clutch teeth 41a alignable with the external teeth of clutch hub 10a. A countershaft 42 is rotatably supported by a pair of bearings B₂ and B₃ on the transfer casing and located in parallel with the input shaft 10. The countershaft 42 carries low and high speed countergears 43, 44 fixed thereto, the former gear 43 being permanently meshed with the low speed drive gear 41.

An intermediate shaft 20 is rotatably supported by a bearing B₅ on the transfer casing and is coaxially connected at its inner end with the input shaft 10 by means of a bearing B₄ to permit relative rotation of the shafts 10 and 20. The intermediate shaft 20 is integrally provided at its inner end with a clutch hub 20a and splined at its outer portion with a trunnion shaft 31 of a differential gear unit 30. The differential gear unit 30 acts to distribute drive power to a pair of side gears 33, 34 through a pair of pinion gears 32, 32 which pinion gears are journalled on the trunnion shaft 31. The right-hand side gear 33 is integral with a first output shaft 33a, which shaft is rotatably supported by a pair of bearings B₆ and B₈ on the transfer casing and is coaxially connected with the outermost end of intermediate shaft 20 by means of a bearing B₇. The left-hand side gear 34 has a tubular shaft 34a concentric with the intermediate shaft 20 and splined with a high speed drive gear 45. The high speed drive gear 45 has a set of external clutch teeth 45a and is permanently meshed with the high speed counter-gear 44 on the countershaft 42. A second output shaft 50 is rotatably supported by a pair of bearings B₉ and B₁₀ and integrally provided with an output gear 51 which is permanently meshed with the high speed counter-gear 44, the output gear 51 having the same number of teeth as those of the high speed drive gear 45. In the above-noted construction, the first and second output shafts 33a and 50 are drivingly connected to rear and front wheel drive axles respectively.

A first selector gear unit 60 is provided to selectively complete low and high speed gear trains in the transfer device. The selector gear unit 60 includes a clutch hub sleeve 61 with internal clutch teeth which is slidably mounted in toothed engagement with the external teeth of clutch hub 10a. The clutch hub sleeve 61 is operatively connected with a first shift fork (not shown) to be shifted by a single operator's lever as described hereinafter. When the clutch hub sleeve 61 is displaced by the first shift fork in a leftward direction, it is brought into engagement with the external clutch teeth of clutch hub 10a and low speed drive gear 41 to provide a drive connection between the low speed drive gear 41 and the input shaft 10. When the clutch hub sleeve 61 is displaced by the first shift fork in a rightward direction, it is brought into engagement with the external clutch teeth of clutch hubs 10a and 20a to provide a direct drive connection between the input and intermediate shafts 10 and 20.

The transfer device is further provided with a second selector gear unit 70 which serves to selectively lock and free the differential gear unit 30. The selector gear unit 70 is assembled coaxially with the first selector gear unit 60 and is located adjacent to the same to simplify the structure of the transfer device. The selector gear unit 70 includes a clutch hub sleeve 71 with internal clutch which is operatively connected with a second shift fork (not shown) to be shifted by the operator's lever as described hereinafter. The clutch hub sleeve 71 is slidably mounted in toothed engagement with the external teeth of clutch hub 20a and high speed drive gear 45 to lock the differential gear unit 30. When the clutch hub sleeve 71 is displaced by the second shift fork in a leftward direction, it is disengaged from the external clutch teeth 45a of high speed drive gear 45 to make the differential gear unit 30 operative.

Figure 3:
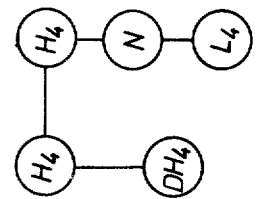
FIG. 3 illustrates a shift pattern of the selector gear units of FIG. 1.

In FIG. 3, there is illustrated a shift pattern of the operator's lever to selectively shift the first and second shift forks. When the operator's lever is moved from a neurtral position N to a low speed position L₄, the first shift fork is shifted to engage the clutch hub sleeve 61 with the external clutch teeth of clutch hub 10a and low speed drive gear 41. When the operator's lever is moved from the neutral position N to a right-hand high speed position H₄, the first shift fork is shifted to engage the clutch hub sleeve 61 with the external clutch teeth of clutch hubs 10a and 20a. In case the operator's lever is moved from the right-hand position H₄ to a left-hand high speed position H₄, it is disconnected from the first shift fork and connected with the second shift fork. When the operator's lever is moved from the left-hand position H₄ to a high speed differential position DH₄, the second shift fork is shifted to disengage the clutch hub sleeve 71 from the external clutch teeth 45a of high speed drive gear 45. In the above-noted shift pattern, the characters L₄ and H₄ respectively indicate low and high speeds for four wheel direct drive, and the character DH₄ indicates a high speed for four wheel differential drive.

Figure 4:
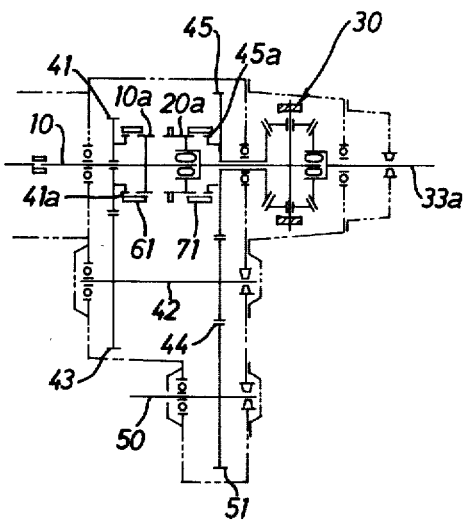
FIGS. 4, 5 and 6 illustrate the mode of operation of the transfer device.

In operation of the transfer device 100, when the operator's lever is in the neutral position N, the clutch hub sleeve 61 is engaged only with the external clutch teeth of clutch hub 10a, while the clutch hub sleeve 71 is engaged with the external clutch teeth of clutch hub 20a and high speed drive gear 45. (see FIGS. 1 and 2) Under this condition, the first and second output shafts 33a and 50 are free from the input shaft 10 to permit free rotation of the input shaft 10. If the vehicle is stopped, the rotation torque of input shaft 10 may be transmitted to drive another mechanical device, if necessary. When the operator's lever is moved from the neutral position N to the low speed position L₄ to engage the clutch hub sleeve 61 with the external clutch teeth of clutch hub 10a and high speed drive gear 41, as shown in FIG. 4, the rotation torque of input shaft 10 is conveyed to the high speed counter-gear 44 by way of the gears 41, 43 and the counter-shaft 42. Then, the rotation torque is transmitted to the first output shaft 33a by way of the gear 45 and the differential gear unit 30 and is further transmitted to the second output shaft 50 by way of the output gear 51. Thus, the output shafts 33a and 50 are driven at a reduction speed ratio to complete a low speed gear train, the speed ratio being determined by the gears 41, 43, 44, 45 and 51. During operation in the low speed range, the differential gear unit 30 is inoperative, and the output shafts 33a, 50 are directly driven by the low speed gear train at a low speed to ensure smooth travel of the vehicle on waste terrain such as barren land, sands or steep slope.

Figure 5:
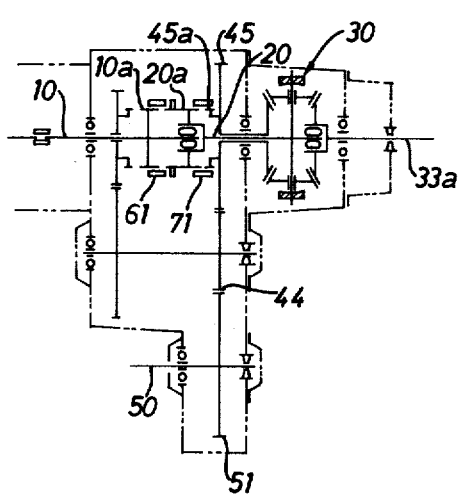

When the operator's lever is moved from the neutral position N to the right-hand high speed position H₄ to engage the clutch hub sleeve 61 with the external clutch teeth of clutch hubs 10a and 20a, as shown in FIG. 5, the rotation torque of input shaft 10 is directly transmitted to the high speed drive gear 45 through the second selector gear unit 70. Then, the rotation torque is transmitted to the first output shaft 33a through the differential gear unit 30 and is further transmitted to the second output shaft 50 through the gears 44 and 51. Thus, the first and second output shafts 33a and 50 are driven at the same speed as that of the input shaft 10 to complete a high speed gear train. During operation in the high speed range, the differential gear unit 30 is still inoperative, and the output shafts 33a and 50 are directly driven by the high speed gear train at a relatively high speed to prevent wheel slippage on ice or snow or slippery terrain.

Figure 6:
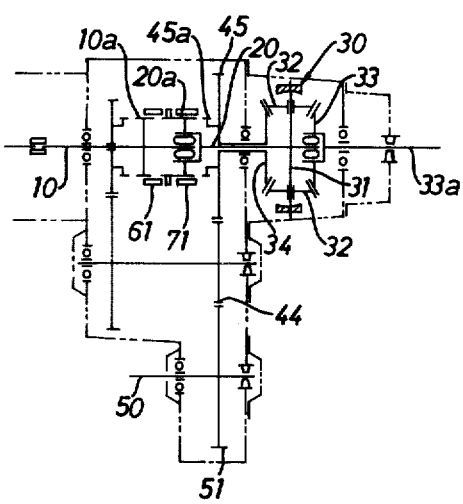

When the operator's lever is moved from the lefthand high speed differential position H₄ to the high speed differential position DH₄, the clutch hub sleeve 71 of second selector gear unit 70 is separated from the external clutch teeth 45a of high speed drive gear 45 to make the differential gear unit 30 operative. (see FIG. 6) Then, the rotation torque of input shaft 10 is transmitted to the intermediate shaft 20 through the first selector gear unit 60 to drive the trunnion shaft 31 of differential gear unit 30. Thus, the drive power from intermediate shaft 20 is equally distributed to both the side gears 33 and 34 through the pinion gears 32 in such a manner that the first and second output shafts 33a and 50 are driven respectively by power from the side gear 33 and by power from the side gear 34. Under this operating condition, the differential gear unit 30 is effectively operated to ensure high speed travel of the vehicle on waste or paved terrain.

Figure 7:
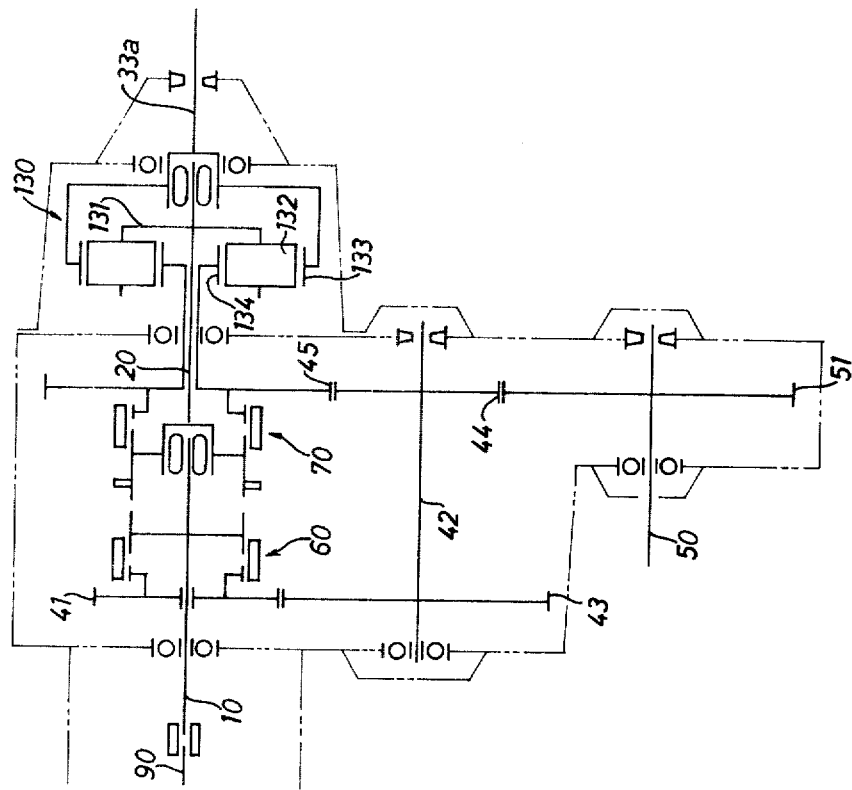
FIG. 7 is a schematic skeleton view of a modification the transfer device of FIG. 1.
Figure 8:
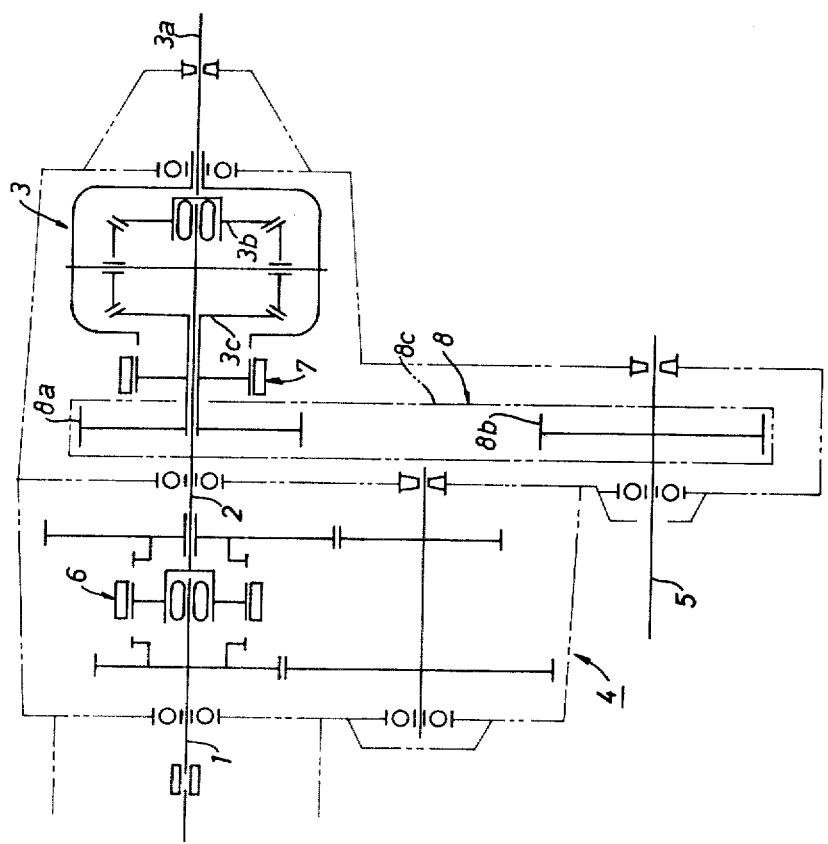
FIG. 8 is a schematic view of a conventional transfer device.

In the above embodiment, although the differential gear unit 30 is provided to distribute drive power to the first and second output shaft 33a and 50, it may be replaced with such a planetary differential gear unit 130 as shown in FIG. 7. The planetary differential gear unit 130 comprises a carrier member 131 connected to the intermediate shaft 20, a sun gear 134 connected to the high speed drive gear 45, a ring gear 133 connected to the first output shaft 33a, and a set of planet gears 132 journalled on the carrier 131. In the differential gear unit 130, the carrier member 131 acts as an input member, and the planet gears 132 are in mesh with the sun gear 134 and the ring gear 133 to distribute drive power to the first and second output shafts 33a and 50. Thus, the ring gear 133 acts as one output member, and the sun gear 134 acts as the other output member. Furthermore, when the transfer device 100 is to be used for two or four wheel drive, the differential gear unit 30 or 130 is removed from the high speed drive gear 45, and the intermediate shaft 20 is utilized as the first output shaft.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a transfer device associated with a power transmission unit for an automotive vehicle, comprising:
    an input shaft for connection to an output shaft of said transmission unit;
    an intermediate shaft rotatably coupled at the inner end thereof with said input shaft;
    a first output shaft rotatably coupled at the inner end thereof with the outer end of said intermediate shaft;
    a countershaft arranged in parallel with said input and intermediate shafts and being integrally provided with low and high speed counter-gears;
    a second output shaft arranged in parallel with said countershaft and being integrally provided with an output gear meshing with said high speed countergear;
    a low speed drive gear rotatable on said input shaft and being in mesh with said low speed countergear;
    a high speed drive gear rotatable on said intermediate shaft and being in mesh with said high speed countergear, said high speed drive gear having the same number of teeth as those of said output gear; and
    a differential gear unit mounted on said intermediate shaft and including an input member connected with said intermediate shaft, a first output member connected with first output shaft, and a second output member connected with said high speed drive gear;
further comprising;
    a first selector gear unit mounted on said input shaft and adapted only for selectively connecting said input shaft to one of said low speed drive gear and said intermediate shaft to complete a low or high speed gear train;
    a second selector gear unit arranged between said low and high speed drive gears and mounted on the inner end of said intermediate shaft coaxially adjacent with said first selector gear unit and adapted only for connecting said high speed gear to said intermediate shaft independently of said first selector gear unit to make said differential gear unit inoperative and for disconnecting said high speed drive gear from said intermediate shaft to make said differential gear unit operative.

2. A transfer device as set forth in claim 1, wherein said first selector gear unit comprises a first clutch hub integral with said input shaft and having external clutch teeth thereon; a first set of external clutch teeth integral with said low speed drive gear and alignable with the external clutch teeth of said first clutch hub; a second clutch hub integral with the inner end of said intermediate shaft and having external clutch teeth alignable with the external clutch teeth of said first clutch hub; and a first clutch hub sleeve axially slidable in toothed engagement with the external clutch teeth of said first clutch hub to be engaged with the external clutch teeth of said low speed drive gear or said second clutch hub; and wherein said second selector gear unit comprises a second set of external clutch teeth integral with said high speed drive gear and alignable with the external clutch teeth of said second clutch hub; and a second clutch hub sleeve axially slidable in toothed engagement with the external clutch teeth of said second clutch hub to be engaged with the external clutch teeth of said high speed drive gear.

3. A transfer device as set forth in claim 1, wherein said differential gear unit comprises a trunnion shaft connected to said intermediate shaft; a set of pinion gears journalled on said trunnion shaft; and a pair of side gears in mesh with said pinion gears and being respectively connected with said first output shaft and said high speed drive gear to distribute drive power to said first and second output shafts.

4. A transfer device as set forth in claim 1, wherein said differential gear unit comprises a carrier member connected with said intermediate shaft; a sun gear connected with said high speed drive gear; a ring gear connected with said first output shaft; and a set of planet gears journalled on said carrier member and in mesh with said sun gear and said ring gear.

* * * * *